Feb. 1, 1972   H. DARMOCHWAL   3,639,550
METHOD OF FORMING RECTANGULAR CROSS-SECTION FOAM
POLYURETHANE BY VIBRATING THE SIDES OF THE
FORMING CONVEYOR
Filed Aug. 19, 1968   2 Sheets-Sheet 1
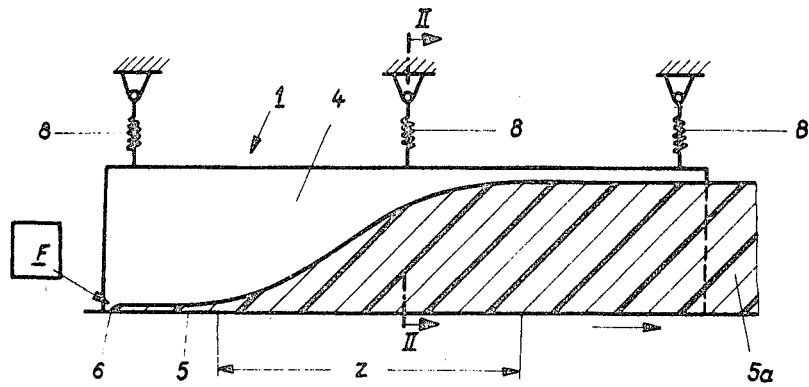
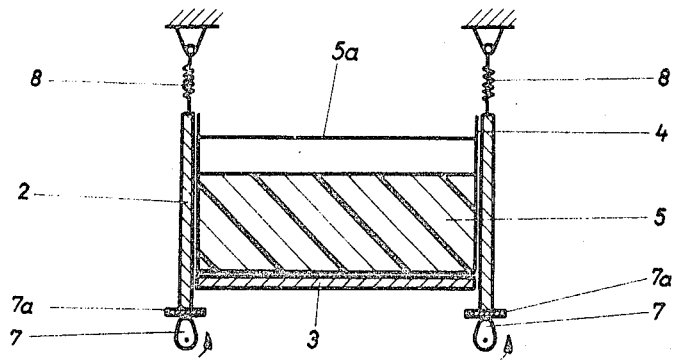
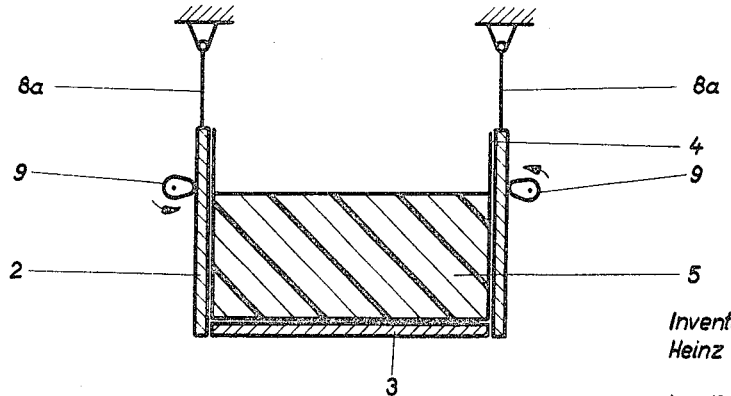
Inventor:
Heinz Darmochwal
by Michael S. Striker
his Attorney

3,639,550
METHOD OF FORMING RECTANGULAR CROSS-SECTION FOAM POLYURETHANE BY VIBRATING THE SIDES OF THE FORMING CONVEYOR

Heinz Darmochwal, Memmingen, Germany, assignor to Metzeler AG, Munich, Germany
Filed Aug. 19, 1968, Ser. No. 753,503
Claims priority, application Germany, Aug. 21, 1967, P 17 04 845.2
Int. Cl. B29d 27/04
U.S. Cl. 264—51
5 Claims

ABSTRACT OF THE DISCLOSURE

A continuous slab of foam material is produced by pouring free-rising polyurethane foam into a confining path defined by a liner of release paper which travels with a substantially horizontal bottom wall between two upstanding side walls to convey the loaf through a foaming zone where the loaf rises to form a slab. The side walls are vibrated to prevent adherence of rising loaf to the liner in regions adjacent to the side walls and to thus insure the formation of a slab having a substantially rectangular cross-sectional outline. The means for vibrating the side walls may include cams and followers, crank drives, eccentrics or analogous vibrating devices which impart to side walls vertical vibratory movements at right angles to the direction of advance of the loaf.

CROSS-REFERENCE TO RELATED APPLICATION

The present method and apparatus constitute improvements over and further developments of methods and apparatus disclosed in the copending application Ser. No. 745,267, filed July 16, 1968, by Darmochwal et al. for "Method and Apparatus for the Production of Foamed Slabs of Rectangular Cross Section" and assigned to the same assignee.

BACKGROUND OF THE INVENTION

The present invention relates to a method and apparatus for the production of foam material. More particularly, the invention relates to a method and apparatus for the production of slabs consisting of flexible urethane stock or analogous synthetic plastic material. Still more particularly, the invention relates to continuous production of slabs which are obtained on foaming of free-rising foam which travels lengthwise within the confines of a liner of release paper or the like and which has a substantially rectangular cross-sectional outline.

Slabs with a rectangular cross-sectional outline are presently produced in a stationary mold which accommodates a travelling flexible liner of release paper or the like. The foam is fed onto the liner and advances therewith through a foaming zone where it rises to form a slab. Such travelling liner coats the bottom wall of the trough. Two travelling lateral liners are provided along the inner sides of the side walls of the trough and are caused to perform a composite movement having a horizontal component in the direction of travel of the loaf-supporting liner and an upwardly oriented vertical component. Such composite movements of lateral liners are intended to insure that the sides of the loaf rise at the same rate as the central portion thereof so that the resulting slab does not exhibit a pronounced ridge or crest. The lower edge portions of lateral liners are caused to overlie a substantially runner-like guide plate which extends from the point where the loaf begins to foam. The speed of horizontal movement of lateral liners equals the forward speed of the bottom liner and their speed in the direction upwardly and away from the bottom liner is such that it at least equals or even exceeds the speed at which the loaf rises during travel through the foaming zone. This is intended to reduce friction between the loaf and the lateral liners and to thus insure free rise of the loaf and the formation of a flat-top slab.

A drawback of the just outlined conventional procedure is that the speed of travel of the lateral liners must be controlled with a high degree of precision and that the foaming zone must be supervised at all times in order to insure that the vertical component of advance of each lateral liner corresponds to the speed at which the loaf rises. In certain other types of conventional apparatus, the lateral liners are replaced by rotating disks which flank the foaming zone; however, the speed of such disks must also be controlled with a high degree of precision which involves the use of skilled labor and complicated adjusting and detecting mechanisms.

SUMMARY OF THE INVENTION

One of the objects of my present invention is to provide a simple method of producing foamed slabs of rectangular or substantially rectangular cross-sectional outline.

Another object of the invention is to provide a simple apparatus for the production of such slabs.

An additional object of the invention is to provide an apparatus wherein the entire liner must be advanced at a single speed and in a single direction.

An ancillary object of the invention is to provide a novel conveyor for use in such apparatus.

A concomitant object of the invention is to provide the apparatus with novel means for insuring the formation of slabs with a rectangular cross-sectional outline.

The improved method comprises the steps of feeding free-rising foam into a confining path to form a loaf which is confined from below and at two sides, advancing the loaf lengthwise through a foaming zone wherein the loaf rises to form a slab, and agitating such portions of the advancing loaf which are adjacent to its sides to thus prevent adherence of loaf to the side panels or lateral panels of a travelling liner of release paper or the like which defines the confining path.

The agitating step may comprise imparting to the lateral portions of the loaf vibratory movements. Such movements may be vertical vibratory movements or substantially horizontal vibratory movements at right angles to the direction in which the loaf advances. The intensity of agitation of lateral portions of the loaf can be adjusted to account for the nature of the material of the loaf.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic fragmentary longitudinal vertical sectional view of an apparatus which embodies one form of the invention;

FIG. 2 is a schematic transverse vertical sectional view as seen in the direction of arrows from the line II—II of FIG. 1;

FIG. 3 is a similar transverse vertical sectional view of a second apparatus.

DESCRIPTION OF THE PREFERRED EMBODIMENT

Figure 4:
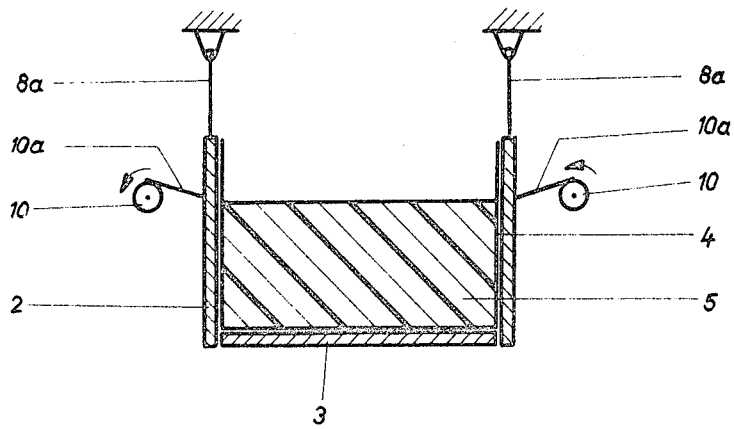
FIG. 4 is a similar transverse vertical sectional view of a third apparatus.

Referring first to FIGS. 1 and 2, there is shown an apparatus which comprises a conveyor having a travelling substantially horizontal bottom wall 3 (which preferably constitutes the upper stretch of an endless belt), a pair of vertical side walls 2 which extend upwardly from the bottom wall 3, a liner 4 of release paper or the like which travels with the bottom wall 3 and has lateral panels adjacent to the inner sides of the side walls 2, a feed F which may include a source of foam and a customary traversing head, and an agitating device which imparts vibratory movements to the side walls 2. This agitating device comprises cams 7 which rotate with horizontal camshafts and act upon followers 7a provided at the lower edges of the side walls. In order to permit vertical reciprocatory movements of side walls, the upper portions of such walls are suspended from a frame (e.g., the ceiling of a hall in the factory) by interposition of resilient elements 8. The numeral 5 denotes the rising loaf and the numeral 5a denotes a slab of rectangular or substantially rectangular cross-sectional outline. The foaming zone Z is shown in FIG. 1.

The operation is as follows:

The feed F supplies free-rising foam onto the bottom panel of the liner 4 (as at 6) whereby such foam forms a loaf 5 which advances lengthwise toward and through the foaming zone Z to rise gradually and to be converted into the slab 5a. The cams 7 are driven to vibrate the side walls 2 up and down and to thereby agitate such portions of the loaf 5 which are adjacent to the lateral panels of the liner 4. This reduces friction between the lateral panels and the adjoining portions of the loaf and thus insures the formation of a rectangular slab 5a. The liner 4 advances with the bottom wall 3 and along the side walls 2. The amplitude and frequency of vibrations imparted to the side walls 2 can be adjusted in dependency on the composition of foam which is supplied by the feed and/or in dependency on the nature and quantity of catalyst. The frequency may be varied between a subsonic and an ultrasonic frequency. The means for adjusting the rate and extent of vibratory movements of side walls may include a variable speed drive for the shafts of cams 7 and one or more sets of spare cams which can be substituted for the cams shown in FIG. 2. The illustrated mechanical agitating device can be replaced by electrical or magnetic agitating devices, for example, by piezoelectric crystals or magnetostrictive rods.

FIG. 3 illustrates a portion of a modified apparatus wherein the side walls 2 of the conveyor are caused to vibrate substantially horizontally at right angles to the direction of travel of the bottom wall 3 and liner 4. This is achieved by suspending the side walls 2 on arms 8a which are pivotally secured to a stationary support and by mounting revolving cams 9 adjacent to the outer sides of the side walls. The amplitude and/or frequency of vibrations imparted to the side walls 2 and hence to those portions of the loaf 5 which are adjacent to such side walls can be regulated within a desired range.

In FIG. 4, the cams 9 of FIG. 3 are replaced by rotary eccentrics 10 which are coupled to the side walls 2 by articulately connected motion transmitting links 10a. The effect of this agitating device is the same as that of the device shown in FIG. 2.

As stated before, the vibrating side walls 2 prevent adherence of the material of the loaf 5 to the adjoining lateral panels of the liner 4 while the loaf rises. This insures that the lateral portions of the loaf rise at the same rate as its central portion to thus bring about the formation of a slab 5a having a flat top, i.e., a slab which does not have a longitudinally extending crest.

Another important advantage of my method and apparatus is that the speed of the travelling loaf 5 need not be monitored while the loaf advances through the foaming zone Z. All that is necessary is to determine the optimum rate of agitation for a particular type of foam, i.e., to determine the optimum amplitude and frequency of vibrations of side walls 2 for treatment of a particular composition which is furnished by the feed F. The agitating device is then set accordingly and its operation need not be monitored, changed or otherwise regulated until and unless the feed starts to furnish a different type of foam.

What is claimed as new and desired to be protected by Letters Patent is set forth in the appended claims:

1. A method of producing foamed slabs of substantially rectangular cross-sectional outline, comprising the steps of feeding a foamable mass of polyurethane lengthwise by means of a conveyor having a bottom wall and upright side walls through a foaming zone wherein the material of said mass foams and rises between said side walls to form a slab; and vibrating said side walls of said conveyor relative to said bottom wall thereof in a direction perpendicular to the direction of advancement of said mass so as to vibrate substantially only side portions of the advancing mass which are adjacent to said side walls of said conveyor, whereby said side portions are induced to rise substantially to the same extent as the central portion of said mass.

2. A method as defined in claim 1, wherein said step of vibrating said side walls consists of an essentially vertical motion.

3. A method as defined in claim 1, wherein said step of vibrating said side walls consists of a motion substantially at right angles to said side walls.

4. A method as defined in claim 1, wherein said conveyor moves in a path which is substantially horizontal.

5. A method as defined in claim 1, further comprising the step of adjusting the intensity of vibration of said portions of the loaf.

References Cited
UNITED STATES PATENTS

| | | | |
|---|---|---|---|
| 3,091,811 | 6/1963 | Hackert | 264—48 X |
| 3,249,486 | 5/1966 | Voisinet | 264—54 X |
| 3,325,823 | 6/1967 | Boon | 264—54 X |
| 3,326,787 | 6/1967 | Jacobs | 264—69 X |
| 3,402,228 | 9/1968 | Wood | 264—71 X |

DONALD J. ARNOLD, Primary Examiner

P. A. LEIPOLD, Assistant Examiner

U.S. Cl. X.R.

18—4 B, 5 A, 5 P; 264—23, 54, 70, 71